United States Patent

[11] 3,630,701

[72] Inventors Gustave Javaux
 Brussels;
 Gilbert Doquire, Spy; Marcel Bodart, Namur, all of Belgium
[21] Appl. No. 835,584
[22] Filed June 23, 1969
[45] Patented Dec. 28, 1971
[73] Assignee Glaverbel
 Watermael-Boitsfort, Belgium
[32] Priority July 24, 1968
[33] Luxembourg
[31] 56.578

[54] METHOD AND APPARATUS FOR MANUFACTURING FLAT GLASS ON A BATH OF MOLTEN METAL
 22 Claims, 7 Drawing Figs.
[52] U.S. Cl.................................................... 65/27,
 65/32, 65/99 A, 65/168, 65/182
[51] Int. Cl....................................................... C03b 18/02

[50] Field of Search............................................. 65/27, 32,
 99 A, 168, 182

[56] References Cited
 UNITED STATES PATENTS
 3,337,322 8/1967 Taylor......................... 65/32
 3,356,476 12/1967 Gulotta....................... 65/32 X Primary Examiner—Arthur D. Kellogg
Attorney—Edmund M. Jaskiewicz ABSTRACT: Flat glass is manufactured on a bath of molten material in a partially closed chamber with the glass being cooled as it moves over the molten bath. A gas is circulated within the chamber to maintain a protective atmosphere therein. At least a portion of the circulated gas is withdrawn from one place in the chamber above the molten gas, subjected to a treatment which may be cooling or purifying, and then reintroduced into the chamber at another place above the bath so as to recycle the protective gas.

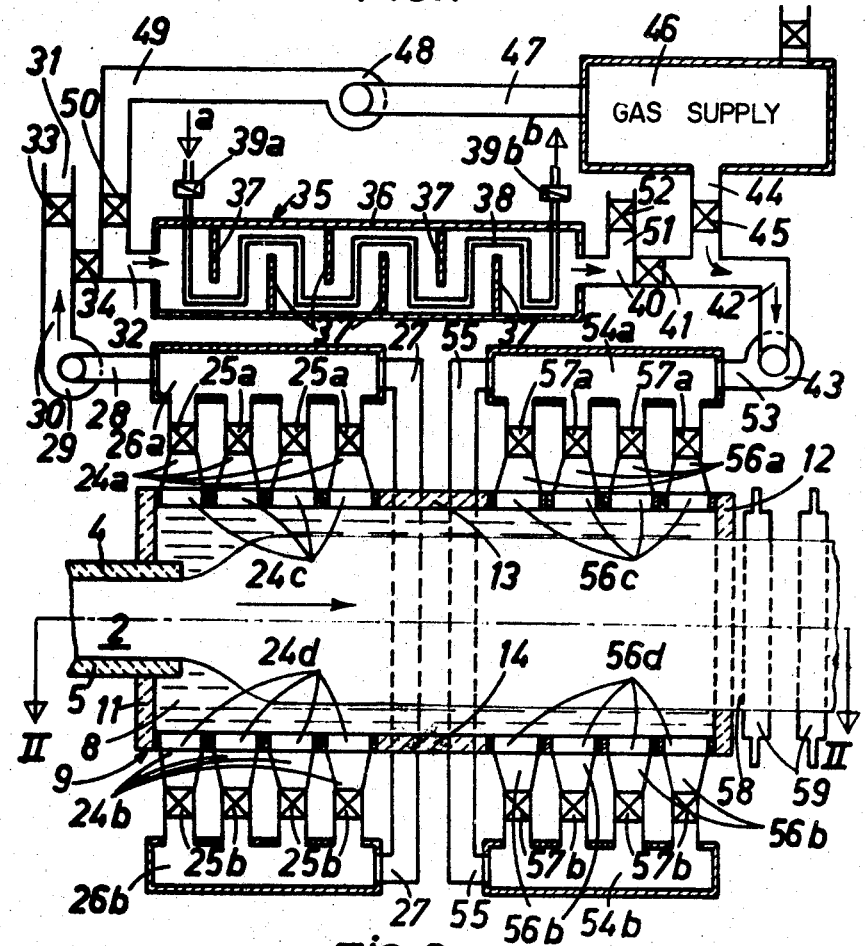
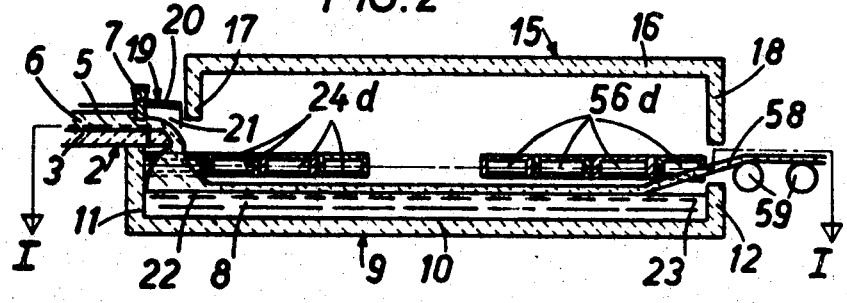

INVENTORS
GUSTAVE JAVAUX
GILBERT DOQUIRE
MARCEL BODART

BY *Edmund M. Jaskiewicz*
ATTORNEY

METHOD AND APPARATUS FOR MANUFACTURING FLAT GLASS ON A BATH OF MOLTEN METAL

The present invention relates to the manufacture of flat glass on a bath of molten material, more particularly, to a method and apparatus for circulating currents of protective gas above the surface of the molten bath.

In the manufacture of flat glass on a bath of molten metal in a partially closed tank or chamber it has been known to circulate a protective gas through the tank so as to maintain a protective atmosphere within the tank above the molten bath. This protective atmosphere prevents a number of active elements in the air, such as atmospheric oxygen, from reacting chemically with the molten metal and forming metallic compounds which may form substances detrimental to the glass.

In addition to this protective atmosphere, gases which are inert to the molten metal of the bath have been introduced directly into the bath. Such gases, which may be hydrogen, pass through the molten metal in the form of bubbles and accelerate the extraction in gaseous form of a considerable portion of the active elements in the molten metal, such as sulphur. These extracted active elements join up with the gaseous bubbles so as to be carried to the surface of the metallic bath. In order to prevent contamination of the glass by the subsequent reaction products, the inert gases must be introduced at such locations that when the bubbles leave the metallic bath they escape directly to the interior of the tank without encountering the glass.

In spite of these known methods of reducing the formation of substances which might contact the glass, glass still leaves the tank with surface areas damaged by contaminating substances.

As a result of extensive study of this problem of glass contamination it has been suggested that a major reason for the deterioration of the glass may be an excessive concentration of gaseous metallic compounds formed as a result of the relatively slow flow of those currents of protective gases which tend to escape through openings in the walls of the tank. These currents may occur in the existing forms of this apparatus since the quantity of gas introduced into the tank depends largely on how effectively the tank was sealed. Moreover, because of the relatively random flow of other currents of protective gases within the tank, concentrated groups of gaseous metallic compounds may be entrained by these random flow currents when they meet the more slowly moving currents of protective gases. The concentrated groups of gaseous metallic compounds may thus be conveyed to that portion of the tank in which the bath of metal is at a cooler temperature. As the gases tend to escape from the tank, the gases and the entrained concentrated groups of metallic compounds encounter lower temperature walls and coolers so that portions of the compounds are condensed upon these structures. The amount of the compounds which are condensed increases in proportion as the degree of concentration of the metallic compounds increases in the protective gases. When the metallic compounds are subjected to the reaction of a reducing gas, such as hydrogen, which is generally associated with the protective gases, the metallic compounds become transformed into numerous particles of metal which ultimately drop upon the surface of the layer of molten glass and thus damage the glass in a relatively large number of places.

It is therefore the principal object of the present invention to provide a novel and improved method and apparatus for manufacturing flat glass on a bath of molten metal within a partially closed tank.

It is another object of the present invention to provide a method and apparatus for preventing deterioration or contamination of flat glass while it is being manufactured on a bath of molten metal.

According to the present invention there is disclosed a method and apparatus for recycling at least a portion of the protective gas circulating within a tank containing a bath of molten material upon which the glass floats. The protective gas is withdrawn from at least one place above the surface of the molten bath and then at least a portion of the withdrawn gas is introduced into the tank or chamber in at least one other place. The protective gas may comprise a single gaseous component or a mixture of two or more gaseous components.

By recovering a portion of the protective gas after it has been in protective relationship with respect to the molten material instead of permitting all of the protective gas to escape and be dispersed to the atmosphere and by returning the recovered gas to at least one other place in the tank so that the gas can still be used for protecting the material, it is now possible to provide a relatively economic circulation within the tank or chamber of flows of gas which are more considerable and move at greater speeds than those previously known gas flows whose flow within the tank was determined largely by the sealing effectiveness of the tank. The flow of protective gases as disclosed herein prevents relatively concentrated groups of gaseous metallic compounds from forming and form moving in a disorderly or random fashion within the tank. In addition, by recirculating at least a portion of these gas flows at selected locations within the tank the gaseous metallic compounds formed at particular places can be conveyed to other places within the tank where they are not able to be transformed into substances which are likely to contaminate the glass.

The apparatus according to the present invention may comprise a device for treating at least a portion of the gas withdrawn from the tank before this withdrawn portion is reintroduced into the tank. This treatment permits a higher quality gas to be reintroduced into the tank. The treatment device may comprise a cooling device which thus permits cooling of the surface of the layer of molten glass to be more flexibly controlled than with water coolers located within the tank. The treatment device may also comprise a purifying apparatus which in turn may comprise at least two purifying units. One such unit retains substances which condense at lower temperatures and the other unit retains substances which do not condense at such lower temperatures. As a result, the degree of pollution of the protective atmosphere within the tank can be kept at a minimum level.

Other objects and advantages of the present invention will be apparent upon reference to the accompanying description when taken in conjunction with the following drawings, which are exemplary, wherein;

FIG. 1 is a plan view of a chamber together with gas recycling and purifying units according to the present invention with the tank itself being shown in section on line I—I of FIG. 2;

FIG. 2 is a sectional view of the chamber taken along the line II—II of FIG. 1

Proceeding next to the drawings wherein like reference symbols indicate the same parts throughout the various views a specific embodiment and modifications of the present invention will be described in detail.

Figure 3:
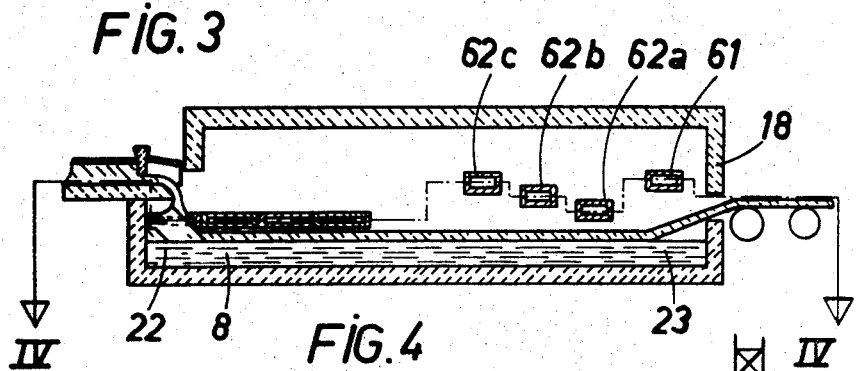
FIG. 3 is a sectional view similar to that of FIG. 2 of a modified chamber for the manufacture of flat glass according to the present invention.

In FIGS. 1 and 2 the glass melting apparatus is merely represented by the downstream end of a casting system 2 having a base 3 and upstanding sidewalls 4 and 5 to channel molten glass 6 past a flow regulating barrier 7 onto a bath 8 of molten metal in a tank or chamber 9. Tank 9 comprises a bottom wall 10, an upstream end wall 11, a downstream end wall 12 and sidewalls 13 and 14. There is also a roof structure 15 which, as may be seen in FIG. 2, has a crown 16, an upstream end wall 17 and a downstream end wall 18. Positioned between the roof structure 15 and the flow regulating barrier 7 is a chamber or passage 19 having a top wall 20 and a sidewall 21.

The interior of tank 9 is heated by suitable heating means known in the art and not shown in the drawings to maintain a hot zone 22 at the upstream end of the tank. The temperature within the tank decreases in the downstream direction. When molten tin is used as the bath 8 the temperature gradient will be from about 1,000° C. near the upstream end wall 11 to about 600° C. near the downstream end wall 12.

Above the surface of the molten bath 8 at the hotter end of the tank there are two groups of four conduits 24a and 24b which extend through the sidewalls 13 and 14 respectively so that their ends 24c and 24d open into the interior of the tank 9. These conduits are provided with valves 25a and 25b and at their outer ends are connected to collectors 26a and 26b which are interconnected by a conduit 27.

Extending from the collector 26a is a suction conduit 28 leading to a suction fan 29. In operation, fan 29 continuously withdraws gas from the hotter end of the tank through conduits 24a and 24b and the collectors 26a and 26b. The discharge or delivery conduit 30 of fan 29 is connected to conduits 31 and 32. Conduit 31, which leads to the atmosphere, is provided with a valve 33 and is the main conduit for evacuating the gases from the tank 9. Conduit 22 is provided with a valve 34 and is connected to one end of a cooling device 35. Cooling device 35 comprises an elongated metal chamber 36 having a series of internal baffles 37 arranged to provide a tortuous path therethrough for gases. A pipe 38 is also mounted within chamber 36 and contains a coolant which flows in the direction indicated by the arrows $a$ and $b$. The coolant pipe 38 is provided with control valves 39a and 39b. The other end of cooling device 35 is connected through conduit 40, a valve 41 and suction conduit 42 to a blower 43.

A supply reservoir 46 for protective gas is connected to the suction conduit 42 by conduit 44 and valve 45. The reservoir 46 is also connected to the inlet end of cooling device 35 by conduits 47 and 49 between which is positioned an auxiliary fan 48. Conduit 49 is provided with a valve 50. The cooling device 35 can be flushed with protective gas to remove any air therein by operating auxiliary fan 48 while valves 34 and 41 are closed and opening valve 50 and a valve 52 in a discharge conduit 51 near the discharge end of the cooling device.

Blower 43 delivers cooled gas to the cooler or lower temperature end of tank 9 through a conduit 53, distributing boxes 54a and 54b and conduits 56a and 56b. A conduit 55 interconnects the two distributing boxes. The conduits 56a and 56b are provided with valves 57a and 57b and open into the tank above the level of the molten bath 8 at openings 56c and 56d.

Auxiliary conduits which are not shown in the drawings are provided for blowing protective gas through the glass entry and exit slots at opposite ends of tank 9 in order to prevent ambient air from entering the tank through these openings.

At the exit end of the tank 9, glass sheet 58 is lifted from the molten bath and conveyed by rollers 59 to an annealing lehr which is not shown in the drawings.

In the operation of the apparatus illustrated in FIGS. 1 and 2, the cooling device 35 is initially flushed with the protective gas which generally consists of a certain proportion of hydrogen. As an example, the protective gas may be a mixture of 95 percent nitrogen and 5 percent hydrogen. This flushing operation removes air from the cooling device and the air is replaced by the protective gas.

Prior to melting the metal, which may be tin, to form the molten bath 8, valves 33 and 45 are opened and blowers 29 and 43 are operated to remove air from the tank and to replace the air by the protective gas. When the space within the tank above the molten bath has been positively filled with the protective gas the valves 33, 50 and 52 are closed and the valves 34 and 40 are opened. As the molten ribbon of glass is being cast upon the surface of the molten metal bath a strong positive current of protective gas flows within the tank from the inlet openings 56c and 56d near the cooler end of the tank to the outlet openings 24c and 24d near the hotter end of the tank. The cooling action of the gas flow on the floating glass can be controlled to a certain extent by valves 39a and 39b which control the supply of coolant, such as water, through pipe 38 and thus influence the extent of cooling of the gases during the recycling operation. The cooling action of the gas flow on the floating glass will also accelerate the cooling of the surface of the layer of molten glass.

It is thus apparent that at least a portion of the protective gas within the tank is withdrawn from the tank above the bath at the higher temperature end and reintroduced into the tank above the bath at the low temperature end. This current of protective gas is thus in counterflow relationship to the movement of the ribbon of glass through the tank on the molten bath.

The valves 33 and 50 can be adjusted to vary the ratio of the mixture between the recycled protective gas and fresh protective gas from the supply reservoir 46.

Figure 4:
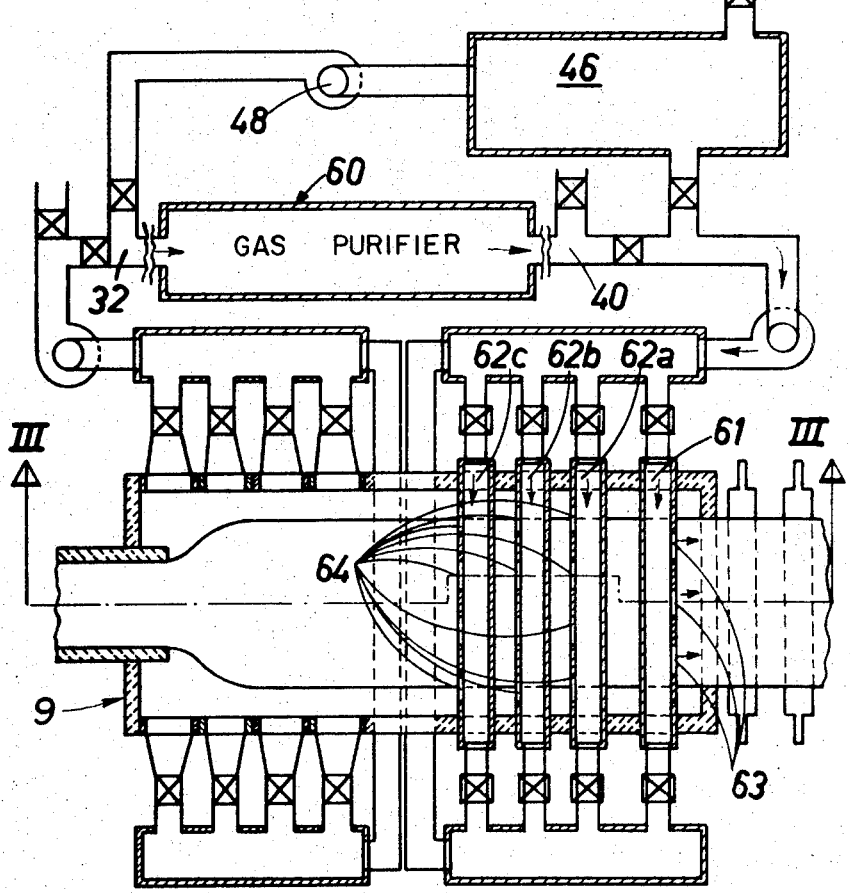
FIG. 4 is a view similar to that of FIG. 1 with the tank of FIG. 3 being shown in section on the line IV—IV of FIG. 3.

Proceeding next to FIGS. 3 and 4 the apparatus illustrated therein is provided with a purifying apparatus 60 instead of the cooling apparatus 35 in the embodiment of FIGS. 1 and 2. Only those elements of this modified apparatus which differ from the structure disclosed with respect to FIGS. 1 and 2 will be described.

The protective gas enters the tank 9 from four conduits 61, 62a, 62b and 62c which extend transversely across the tank and are located at different levels above the bath as shown in FIG. 3. Conduit 61 is provided with a series of openings 63 which direct the gas leaving this conduit parallel with the surface of the metal bath and toward the downstream cooler end of the tank in order to prevent ambient air from entering the tank through the glass exit slot underneath roof end wall 18. The conduits 62a, 62b and 62c are provided with gas discharge openings which direct the gas from the respective conduits parallel with the surface of the metal bath 8 and toward the hotter end of the tank. The apparatus of FIGS. 3 and 4 thus functions similarly to the apparatus of FIGS. 1 and 2 except that the recycled protective gas is free from impurities picked up as the gas proceeds through the tank instead of being merely cooled.

It is pointed out that it is not necessary to recycle all of the protective gas circulating within the tank but only a portion of this gas may be withdrawn from above the surface of the molten bath in the hot zone of the tank. At least a portion of this withdrawn gas may be passed through a purifying device and the purified gas then reintroduced into the cooler zone of the tank. As a result, the quantity of protective gas passing through the tank can be increased and the quality of the currents of gas introduced into the tank can be considerably improved. The degree of pollution of the protective atmosphere with respect to the molten bath can be significantly reduced if at least a portion of the gas taken from above the surface of the molten bath is passed through at least one device for removing substances which are condensable at a low temperature and then through at least another purifying device for removing substances which do not condense at low temperature, in a manner to be presently described.

Figure 5:
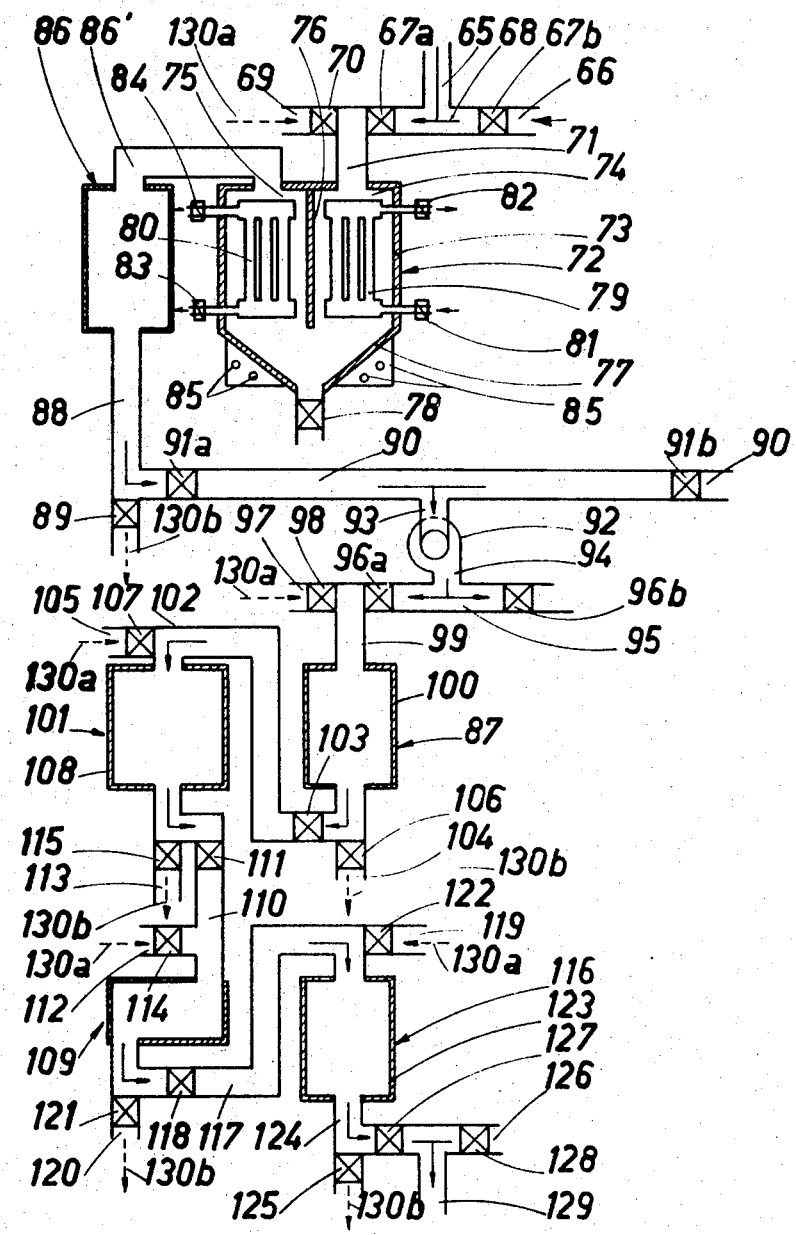
FIG. 5 is a diagrammatic view of a gas purification apparatus according to the present invention.

In FIG. 5, the purifying apparatus 60 is illustrated in greater detail and includes a conduit 65 at the top of the drawing which may be considered to correspond to the conduit 32 leading to the left end of purifier 60 in FIG. 4. Conduit 65 leads into a conduit 66 having valves 67a and 67b on opposite sides of its junction with conduit 65. Downstream of valve 67a in the direction of arrow 68 conduit 66 is connected to a conduit 69 through a valve 70 and to a branch conduit 71 which leads to a condenser 72. Condenser 72 comprises a reservoir 73 the upper portion of which is divided into two compartments 74 and 75 by a petition 76 and the lower portion of which is in the form of a funnel 77 having a bottom valve 78. Compartments 74 and 75 accommodate cooling devices 79 and 80 having coolant flow control valves 81–82 and 83–84 respectively. Electric heating elements 85 are positioned around funnel 77 to maintain a suitable temperature in the lower portion of the reservoir. Condenser 72 communicates with a filter 86 through a connecting conduit 86'. After the protective gas is cooled in the condenser 72 and filtered it is then passed on to an absorber 87 which absorbs hydrogen sulfide from the gas. The gas flows to the absorber through a conduit 88, valve 91a, conduits 90 and 93, auxiliary blower 92, conduits 94 and 95, valve 96a and conduit 99.

In order to remove gases which condense at low temperature, for example vapors of the metal forming the bath or of metal compounds such as SnS, it is only necessary to lower the temperature of the protective gas withdrawn from the tank.

The elimination of certain polluting gases which do not condense at low temperature, such as $H_2S$ and water vapor, can be carried out by bringing the withdrawn gas into contact with a substance which retains such polluting gases.

The absorber 87 includes a metal container 100 charged with a solid substance such as caustic soda in flake form or limonite to offer a large reaction surface to the protective gas. Limonite has the advantage of being more easily handled than caustic soda. The caustic soda eliminates inter alia sulphides and more particularly hydrogen sulphide.

On leaving the absorber 87, the gas flows to a deoxygenation chamber 101 through a valve 103 and a conduit 102. In the deoxygenation chamber 101, the oxygen in the flow of protective gas is reacted with hydrogen in the presence of a catalyst which promotes a water-forming reaction. The catalyst may be alumina impregnated with metallic palladium, palladium mounted on an alumina support in order to increase the reaction surface and reduce to a minimum the quantity of metal to be used, or platinum.

Upon leaving the deoxygenating device 101, the gas passes to a cooling device 109 through a conduit 110 and a valve 111. The cooling device reduces the temperature of the protective gas from the value to which it has been increased by the exothermic reaction in deoxygenation chamber 101 to a value below 25° C. prior to floating the gas to a water vapor absorbing column 116.

The gas flows through a valve 118 in conduit 117 to the column 116 which comprises a container 123 having beds of alumina for drying the gas.

Upon leaving the bottom of the water vapor absorbing column 116, the gas flows through conduit 124 and valve 127 into a conduit 129 which is the equivalent of conduit 40 in FIG. 1. The gas flows along conduit 129 to the cooler end of the tank in which the flat glass is formed.

The apparatus illustrated in FIG. 5 is constructed as one of a pair of two similar structures which can be operated ultimately. These twin structures are linked by the conduits 66, 90 95 and 126 which are shown on the right side of FIG. 5 and are provided with valves 67b, 91b, 96b and 128 respectively. When the apparatus shown in FIG. 5 is to be operated these last-mentioned valves are closed.

Before flowing the protective gas from the tank in which the flat glass is being formed through the purifying apparatus, the several devices in each of the pair of purifying structures are flushed with fresh protective gas from a reservoir such as 46 in FIG. 1. This accomplished by closing valves 67a, 78, 91a, 96a, 103, 111, 118 and 127. The auxiliary blower 48 shown in FIG. 1 thus pumps fresh gas into the purifying system at the positions marked with the broken line arrows 130a which are along conduits 69, 97, 105, 112, and 119 while the valves in these conduits 70, 98, 107, 114 and 122 respectively are open. The streams of flushing gas leave the system at the positions marked with the broken line arrows 130b which are at valve 89, valve 106 and conduit 104, valve 115 and conduit 113, valve 121 and conduit 120, and valve 125. In this manner the air in the various devices is replaced by the protective gas.

After the several devices have been filled with protective gas, the valves 70, 89, 98, 106, 107, 114, 115, 121, 122, and 125 are closed. The valves 67a, 91a, 96a, 103, 111, 118 and 127 are then opened. Auxiliary blower 92 then operates to draw in protective gas from the tank 9.

The gas from the tank 9 flows in the direction of arrows 68 and enters the condenser 72. The temperature of the gas before entering the condenser is kept sufficiently high to prevent premature condensation. As the gas passes through compartment 74 and 75 it is cooled so as to condense some of the components which may have been extracted from inside the tank, such as tin and tin sulfide when the molten bath is molten tin. The condensate is collected in the lower portion of condenser 72 and maintained in the liquid state by the electric heating elements 85. When the glow of gas to be purified is switched to the other purifying apparatus of the twin pair, valve 78 is opened to evacuate the funnel portion 77. In the next stage of the purification in filter 86, solid or solidified components such as tin oxide where molten tin is used in the tank are removed.

After being drawn through the condenser 72 and the filter 86 by the auxiliary blower 92 the partially purified gas is pumped by this blower through the absorber 87, the deoxygenation device 101, cooling device 109, and the water vapor absorbing column 116 to remove contaminants which do not condense at low temperature.

The gas leaving column 116 is thus substantially free from those constituents most likely to form substances which contaminate glass. The purified gas is conducted to the cooler end of the tank 9 at a temperature corresponding to ambient temperature. If desired, the temperature of the purified gas can be raised to a predetermined value before being reintroduced into the tank.

Figure 6:
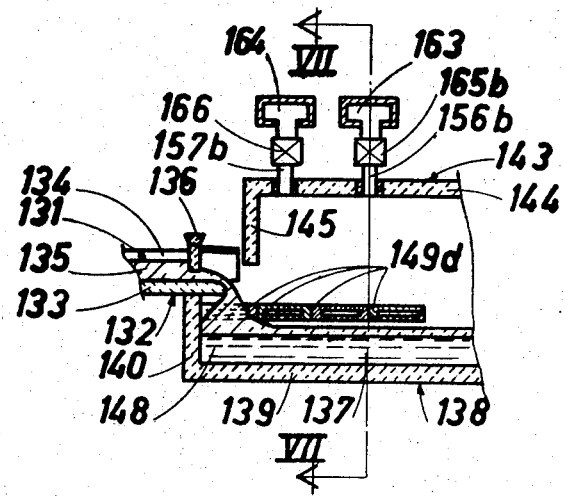
FIG. 6 is a sectional view taken along the line VI—VI of FIG. 7 of an end portion of another form of chamber and shows a portion of a gas recycling system.
Figure 7:
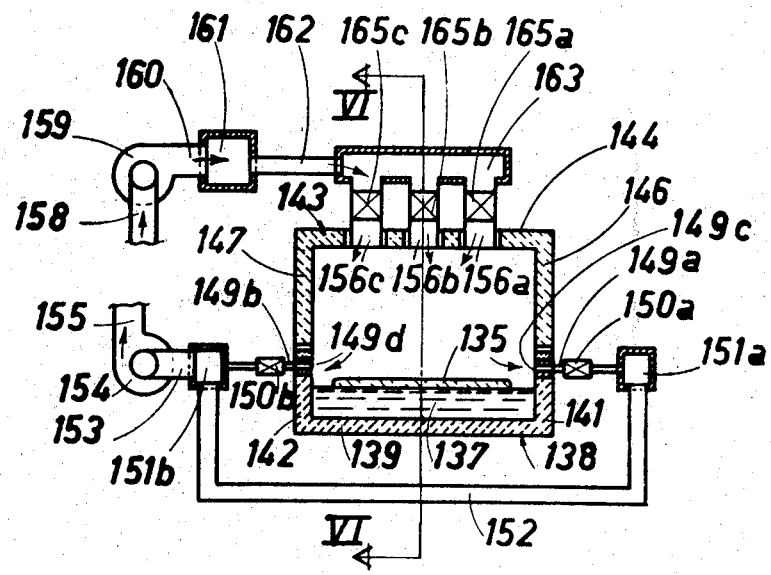
FIG. 7 is a sectional view taken along the VII—VII of FIG. 6.

In FIGS. 6 and 7 only a portion of a glass-melting tank furnace 106 is shown at the downstream end of a casting system 132 having a base 133 and sidewalls only one of which is shown at 134 in FIG. 6. The casting system channels molten glass 135 past a flow-regulating barrier 136 onto a molten metal bath 137 in a tank 138 only the high temperature end of which is shown. The lower portion of the tank is formed by a bottom 139, an upstream end wall 140 and sidewalls 141 and 142. The upper or roof structure of the tank is indicated at 143 and comprises a crown 144, an upstream end wall 145 and sidewalls 146 and 147. Within the tank 138 there are provided known heating means, not shown in the drawings, to maintain the desired temperature with a temperature gradient along the molten metal bath which can be regulated.

Above the surface of the molten metal bath 137 in the portion of the tank comprising the hot zone 148 are two groups of four gas withdrawal conduits 149a and 149b which extend through the sidewalls 141 and 142 respectively so as to open into the tank at 149c and 149d. The conduits are provided with valves 150a and 150b and their outer ends are connected to collectors 151a and 151b respectively which are interconnected by a conduit 152. A suction conduit 153 leads from collector 151b to a fan 154 which delivers the gas withdrawn from the tank along conduit 155. At least a portion of such gas is passed through a cooling or purifying apparatus which is not shown in FIGS. 6 and 7 but which may be similar with the cooling or purifying structures described above.

At least a portion of the gas withdrawn from the tank above the hot zone through conduits 149a and 149b is subsequently reintroduced into the tank at other positions in its hotter end. Thus, at least a portion of the gas is reintroduced into the tank 138 by two groups of three conduits 156 and 157 which extend through the crown 144 and open into the top of the tank. One of such groups of pipes is shown at 156a, 156b and 156c in FIG. 7. Along these conduits is a second group of three conduits one of which 157b is shown in FIG. 6. The gas arrives at these inlet conduits through conduit 158 which is connected to the outlet of the cooling or purifying apparatus, pump 159, conduit 160, collector 161, conduits 162 (only one of which is shown), distributing boxes 163 and 164 and valves 165 and 166 which are indicated with the appropriate one of these numerals followed by the corresponding letter notation to correspond to the respective inlet conduits.

In the operation of the apparatus as shown in FIGS. 6 and 7, strong positive currents of protective gas are maintained in the hotter end of the tank flowing downwardly from the top inlets to the side outlets. As a result, impurities in the tank atmosphere at the hotter end thereof are rapidly withdrawn so that a very high quality atmosphere is maintained in this part of the tank. To prevent movement of gas-containing impurities along the tank toward its cooler end, some of the protective gas withdrawn through conduits 149a and 149b may, after cooling or purification, be reintroduced into the tank at its cooler end so that a flow of gas at a relatively low velocity is also maintained within the tank from the cooler to the hotter end thereof. By way of example, if eight units of protective gas are withdrawn per unit time through the side outlets at the hotter end of the tank, six units of this gas may be reintroduced per unit time into the tank at the top of its hotter end. The remaining two units may be reintroduced into the tank at its cooler end.

For the various forms of apparatus disclosed herein it is preferable to control the amount of gas withdrawn for recycling with respect to the impurity content of the protective gas at a predetermined point within the tank. The quality of the atmosphere can thus be flexibly and economically controlled while keeping the degree of pollution within predetermined limits. Apparatus for thus regulating the amount of gas withdrawn for recycling may thus be provided.

It will be understood that this invention is subject to modification in order to adapt it to different uses and conditions.

What is claimed is:

1. In a method of manufacturing flat glass on a bath of molten material in a partially closed chamber where the glass is cooled as it moves over the molten material, the steps of circulating a gas within the chamber to maintain a protective atmosphere therein, withdrawing at least a portion of the circulated gas from above the surface of the hotter zone of the bath, purifying at least a portion of the withdrawn gas by removing from the withdrawn gas pollutant material which does not condense at low temperatures by bringing the withdrawn gas into contact with a cleaning agent, the cleaning agent being selected from the group consisting of caustic soda and limonite, and introducing the purified gas back into the chamber.

2. In a method as claimed in claim 1 wherein the gas is withdrawn from above the surface of the hotter zone of the bath, cooling at least a portion of the withdrawn gas, and introducing the cooled gas back into the chamber at a cooler zone therein.

3. In a method as claimed in claim 1 wherein the gas is withdrawn from above the surface of the hotter zone of the bath, purifying at least a portion of the withdrawn gas, and introducing the purified gas back into the chamber at a cooler zone therein.

4. In a method as claimed in claim 3 with the step of removing gaseous pollutant material which may be condensable at a low temperature from at least a portion of the withdrawn gas, and removing from the withdrawn gas pollutant material which does not condense a low temperatures.

5. In a method as claimed in claim 4 with the step of lowering the temperature of the withdrawn gas to remove gaseous pollutant material which condenses at a low temperature.

6. In a method as claimed in claim 1 wherein the caustic soda is in flake form.

7. In a method as claimed in claim 3 with the step of subjecting the withdrawn gas to a deoxygenation treatment.

8. In a method as claimed in claim 7 wherein the withdrawn gas is brought into contact with a catalyst promoting a water-forming reaction.

9. In a method as claimed in claim 8 wherein the catalyst is palladium.

10. In a method as claimed in claim 8 wherein the catalyst is on an alumina support.

11. In a method as claimed in claim 1 and the step of regulating the quantity of gas being recycled with respect to the impurity content of the gas at a predetermined point in the chamber.

12. In a method as claimed in claim 1 wherein the gas is withdrawn from above the surface of the hotter zone of the bath, cooling at least a portion of the withdrawn gas before bringing the withdrawn gas into contact with the cleaning agent, and introducing the cooled gas back into the chamber at a cooler zone therein.

13. In an apparatus for the manufacture of flat gas on a bath of molten material in a partially closed chamber having a protective atmosphere of gas therein with the glass cooling as it moves on the bath, the combination of means for withdrawing gas from the chamber from above the bath of molten material, means for introducing withdrawn gas into said chamber at another place so that the protective gas is recirculated within the chamber, and means for treating at least a portion of the withdrawn gas before reintroducing the gas back into the chamber, said treating means comprising a purifying device comprising means for retaining pollutant material which does not condense at a low temperature, said purifying means further comprising a tank having therein a cleaning agent which retains a least a portion of said pollutant material, said cleaning agent being selected from the group consisting of caustic soda and limonite.

14. In an apparatus as claimed in claim 13 wherein said treating means comprises a cooling device.

15. In an apparatus as claimed in claim 13 wherein said purifying device comprises a first means for retaining pollutant material which condenses at a low temperature and a second means for retaining pollutant material which does not condense at a low temperature.

16. In an apparatus as claimed in claim 15 wherein said first purifying means comprises a cooler, and means for circulating a coolant through said cooler.

17. In an apparatus as claimed in claim 13 wherein said caustic soda is in flake form.

18. In an apparatus as claimed in claim 13 wherein said treating means comprises means for removing oxygen from the withdrawn gas.

19. In an apparatus as claimed in claim 18 wherein said oxygen removing means comprises a tank having therein a catalyst for promoting a water-forming reaction.

20. In an apparatus as claimed in claim 19 wherein said catalyst is palladium.

21. In an apparatus as claimed in claim 19 and an alumina support upon which said catalyst is deposed.

22. In an apparatus as claimed in claim 13 and means responsive to the impurity content of the protective gas at a predetermined point in the chamber for regulating the quantity of gas withdrawn from the chamber for recirculation therethrough.

* * * * *